(12) United States Patent
Wears

(10) Patent No.: US 8,356,622 B2
(45) Date of Patent: Jan. 22, 2013

(54) FLUID VALVES HAVING DYNAMIC VALVE TRIM JOINTS

(75) Inventor: William E. Wears, Marshalltown, IA (US)

(73) Assignee: Fisher Control International, LLC, Marshalltown, IA (US)

( * ) Notice: Subject to any disclaimer, the term of this patent is extended or adjusted under 35 U.S.C. 154(b) by 781 days.

(21) Appl. No.: 12/480,425

(22) Filed: Jun. 8, 2009

(65) Prior Publication Data

US 2010/0307610 A1 Dec. 9, 2010

(51) Int. Cl.
*F16K 25/00* (2006.01)
(52) U.S. Cl. ............... 137/454.6; 137/468; 251/324; 251/366; 251/368
(58) Field of Classification Search ............... 137/454.2, 137/454.6, 468; 251/281, 282, 318, 324, 251/366, 368
See application file for complete search history.

(56) References Cited

U.S. PATENT DOCUMENTS

| | | | | |
|---|---|---|---|---|
| 3,506,242 | A * | 4/1970 | Aunspach | 251/361 |
| 3,742,984 | A * | 7/1973 | Wilkins et al. | 137/629 |
| 3,834,666 | A * | 9/1974 | Keith | 251/361 |
| 4,542,879 | A * | 9/1985 | Stein | 251/360 |
| 5,012,841 | A * | 5/1991 | Kueffer | 137/625.39 |
| 5,492,146 | A * | 2/1996 | George et al. | 137/505.41 |
| 6,997,211 | B2 | 2/2006 | Alman et al. | |
| 2003/0197144 | A1 | 10/2003 | Nguyen | |
| 2006/0138375 | A1 * | 6/2006 | Baumann | 251/175 |
| 2008/0203346 | A1 * | 8/2008 | Shu | 251/214 |

FOREIGN PATENT DOCUMENTS

| | | |
|---|---|---|
| EP | 2 042 685 A1 | 4/2009 |
| GB | 1236631 | 6/1971 |
| WO | 2006/073678 A1 | 7/2006 |
| WO | 2008/032101 A1 | 3/2008 |

OTHER PUBLICATIONS

Patent Cooperation Treaty, "International Search Report," issued by the International Searching Authority in connection with related PCT application No. PCT/US2010/033762, mailed Sep. 27, 2010 (4 pages).

Patent Cooperation Treaty, "Written Opinion of the International Searching Authority," issued by the International Searching Authority in connection with related PCT application No. PCT/US2010/033762, mailed Sep. 27, 2010 (9 pages).

* cited by examiner

*Primary Examiner* — Craig Schneider
*Assistant Examiner* — Ian Paquette
(74) *Attorney, Agent, or Firm* — Hanley, Flight & Zimmerman, LLC

(57) ABSTRACT

Fluid valves having dynamic valve trim joints are described. An example apparatus for use with a fluid valve includes a body configured to retain a cage of a fluid valve. Additionally, the example apparatus includes a plurality of projections projecting from and radially spaced about an exterior surface of the body. Each of the plurality of projections is to provide one or more contact points between the body and an inner surface of a bonnet coupled to the fluid valve.

23 Claims, 8 Drawing Sheets

FLUID VALVES HAVING DYNAMIC VALVE TRIM JOINTS

FIELD OF THE DISCLOSURE

The present patent relates generally to fluid valves and, more particularly, to fluid valves having dynamic valve trim joints.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a flow control element or member (e.g., a valve gate, a piston, a valve plug, a closure member, etc.) that operates to control fluid flow through apertures that fluidly couple the inlet(s) to the outlet(s). A closure member is typically coupled to a valve bonnet that is mechanically coupled (e.g., bolted, clamped, threaded into, etc.) to the valve body. Typically, the closure member is configured to engage a sealing structure (e.g., a seat ring) that encompasses a flow path through the valve.

In some instances, different components of the control valve are made of different materials having different coefficients of thermal expansion. As such, in high temperature applications, the coefficients of thermal expansion of the materials from which the different control valve components are made have to be taken into account.

SUMMARY

An example apparatus for use with a fluid valve includes a body configured to retain a cage of a fluid valve. Additionally, the example apparatus includes a plurality of projections projecting from an exterior surface of the body. Each of the plurality of projections is to provide one or more contact points between the body and an inner surface of a bonnet coupled to the fluid valve.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to fluid valves having a dynamic joint between, for example, a cage retainer and a bonnet. Such a dynamic joint allows the cage retainer to move (e.g., slide) relative to the bonnet to accommodate and compensate for thermal expansion or contraction of the valve body, the cage retainer, the bonnet, the cage and/or other valve components. The examples described herein substantially reduce the amount of thermal expansion of the cage retainer by enabling the cage retainer to be made of a material (e.g., a steel material) that is similar to or the same as a material forming a bonnet coupled to the fluid valve. By reducing the amount of thermal expansion of the cage retainer, a cage coaxially aligned with and engaged to the cage retainer may engage a seat ring to maintain the position of the seat ring within the valve body, thereby eliminating the need to use fasteners to couple the seat ring to the valve body. Such an approach may decrease the amount of distortion imparted to the seat ring when coupling the seat ring to the valve body and simplifies the assembly and/or disassembly of the fluid valve.

In some examples described herein, to enable a cage retainer to be made of a material that is similar to or the same as a material forming a bonnet with which the cage retainer is engaged, a plurality of projections made of a different material than the bonnet material and the cage retainer material are radially positioned around an exterior surface of the cage retainer. In general, the plurality of projections act as a spacer between the exterior surface of the cage retainer and an inner surface of the bonnet, thereby preventing the exterior surface of the cage retainer from continuously engaging the inner surface of the bonnet. Preventing the exterior surface of the cage retainer from continuously engaging the inner surface of the bonnet substantially prevents the cage retainer and the bonnet from becoming fixed (e.g., corroded) together over time and, thus, a dynamic joint between these components may be maintained.

Figure 1:
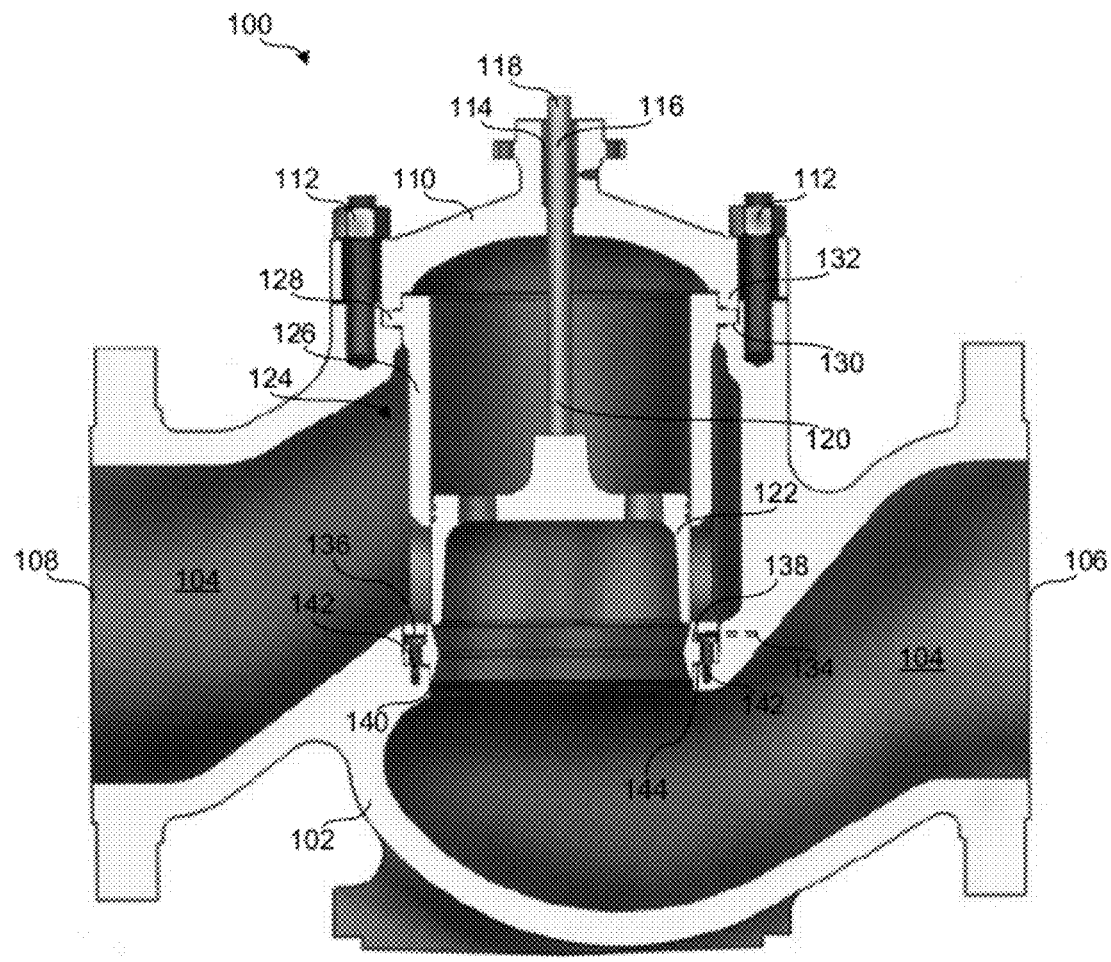
FIG. 1 depicts a known fluid valve.

FIG. 1 depicts a known fluid valve 100 that has a valve body 102 having a fluid flow passageway 104 between an inlet 106 and an outlet 108. A bonnet 110 is coupled to the valve body 102 via a plurality of fasteners 112 and includes a bore 114 to receive a stem 116. An end 118 of the stem 116 extends from the bonnet 110 and is operatively coupled to an actuator (not shown), and an opposite end 120 of the stem 116 is coupled to a closure member 122 (e.g., a valve plug).

To control fluid flow through the valve body 102, valve trim 124 is positioned between the inlet 106 and the outlet 108 to provide certain flow characteristics (e.g., to reduce noise and/or cavitation generated by the flow of fluid through the fluid valve 100). The valve trim 124 includes a hanging cage 126, the closure member 122 and the stem 116.

To secure the hanging cage 126 relative to the valve body 102, the hanging cage 126 includes a flange 128 that is positioned in a circumferential groove 130 defined by the valve body 102 and is engaged by a portion 132 of the bonnet 110. The hanging cage 126 is typically made of a stainless steel material and the valve body 102 and the bonnet 110 are both typically made of a different steel material having a coefficient of thermal expansion different than the stainless steel material. As such, the hanging cage 126, the valve body 102 and/or the bonnet 110 may expand and/or contract at different rates and/or amounts as the fluid valve 100 is subjected to, for example, a thermal cycle. To compensate for the difference in the amount and/or rate of thermal expansion/contraction (e.g., the hanging cage 126 expanding at a faster rate and/or more than the valve body 102 and/or the bonnet 110), a gap 134 is provided between an end 136 of the hanging cage 126 and a seat ring 138 positioned at least partially within an aperture 140 of the valve body 102. The seat ring 138 is coupled or fixed to the valve body 102 via a plurality of fasteners 142 (e.g., thirty (30) fasteners).

To provide a seal between the seat ring 138 and the valve body 102, a spring loaded seal(s) and/or a spiral wound gasket 144 is positioned between the seat ring 138 and the valve body 102. During assembly of the valve 100, as the plurality of fasteners 142 are tightened to couple the seat ring 138 to the valve body 102, the spring loaded seal(s) 144 exerts an opposing force against the seat ring 138 that, in some instances, may distort the seat ring 138. As a result, this distortion may prevent the closure member 122 from properly (e.g., sealingly) engaging the seat ring 138 and, thus, prevent the closure member 122 from properly controlling fluid flow through the fluid valve 100. To reduce or eliminate this distortion, after the seat ring 138 is installed (e.g., after the fasteners 142 are tightened) the seat ring 138 may be machined while coupled to the valve body 102, which is typically a labor intensive and expensive process.

Figure 2:
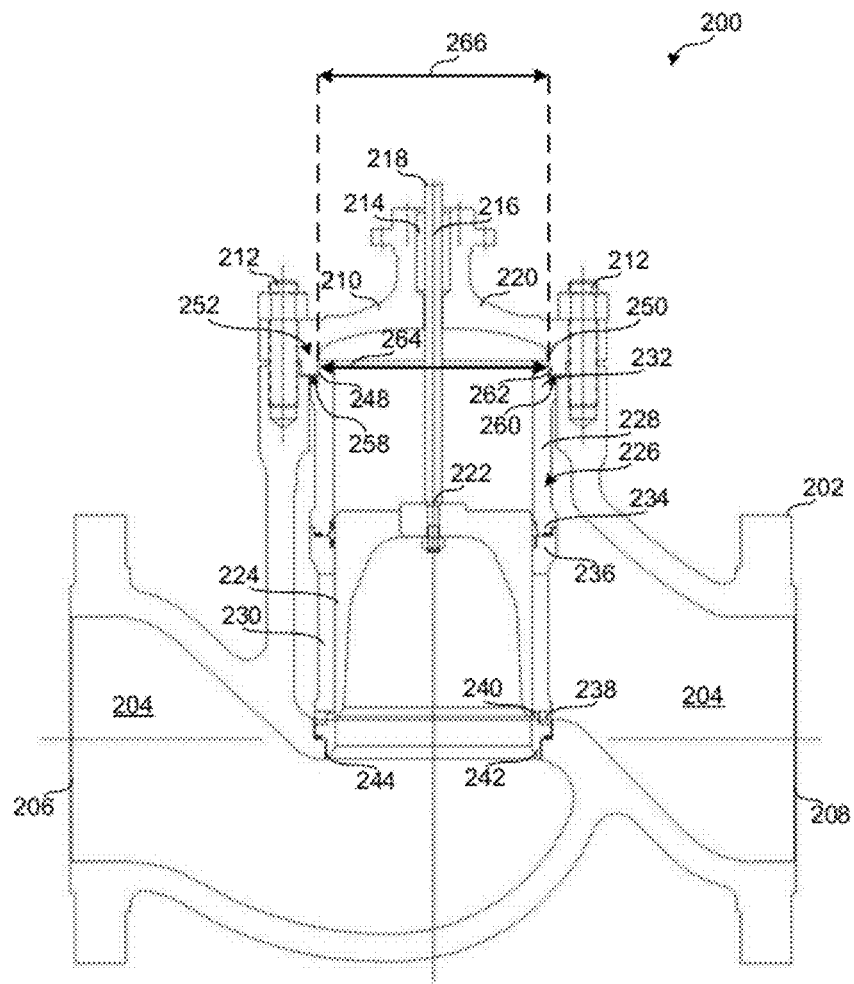
FIG. 2 depicts an example fluid valve having an example cage retainer and a cage.

FIG. 2 depicts an example fluid valve 200 that has a valve body 202 including a fluid flow passageway 204 between an inlet 206 and an outlet 208. A bonnet 210 is coupled to the valve body 202 via a plurality of fasteners 212 and includes a bore 214 to receive a stem 216. An end 218 of the stem 216 extends from a bonnet body 220 and is operatively coupled to an actuator (not shown), and an opposite end 222 of the stem 216 is coupled to a closure member 224 (e.g., a valve plug).

In contrast to the valve trim 124 of FIG. 1, valve trim 226 of the example fluid valve 200 includes a cage retainer 228 (e.g., an upper cage retainer or guide), a cage 230, the closure member 224 and the stem 216.

Generally, an end 232 of the cage retainer 228 is positioned at least partially within the valve body 202 and adjacent the bonnet 210 and an opposing end 234 of the cage retainer 228 engages an end 236 of the cage 230 such that the cage retainer 228 and the cage 230 are coaxially aligned. The cage 230 is positioned within the valve body 202 such that opposing steps or shoulders 238 and 240 of the cage 230 and a seat 242 (e.g., a seat ring) engage and/or interlock to secure the seat 242 at least partially within an aperture 244 of the valve body 202. Such an approach eliminates the need for a plurality of fasteners (e.g., such as the fasteners 142 of FIG. 1) to secure the seat 242 relative to the valve body 202 and, thus, the distortion caused, in some instances, when coupling a seat ring (e.g., the seat ring 138 of FIG. 1) to a valve body (e.g., the valve body 102 of FIG. 1). Additionally, by eliminating the need for a plurality of fasteners to secure the seat 242, the seat 242 may be more easily removed from and/or assembled within the example fluid valve 200 during, for example, routine maintenance.

However, securing the seat 242 to the valve body 202 via the cage 230 and the cage retainer 228 as shown in FIG. 2 eliminates a gap (e.g., the gap 134 of FIG. 1), which enables a hanging cage (e.g., such as the hanging cage 126 of FIG. 1) to expand and/or contract at a different rate and/or amount than a valve body. In the example of FIG. 2, instead of providing a gap between the cage 230 and the seat 242 to accommodate thermal expansion/contraction of the cage 230, the cage retainer 228, the seat 242, the valve body 202 and/or any other valve components, a dynamic joint 252 is provided. As described in greater detail below, the dynamic joint 252 allows the cage 230 and the cage retainer 228 to expand/contract (e.g., in response to thermal cycles) while enabling the cage 230 to remain in contact with the seat 242 to maintain the seat 242 in sealing engagement with the aperture 244.

In addition to the dynamic joint 252, the example of FIG. 2 is also configured to reduce the total amount of thermal expansion/contraction of the cage 230 and the cage retainer 228 assembly. In particular, the cage retainer 228 may be made of a steel material and the cage 230 may be made of a stainless steel material, which typically expands at a faster rate and/or a greater amount than the steel material of the cage 230. Specifically, in the example of FIG. 2, the fluid valve 200 may be provided with the cage retainer 228 made of a first material (e.g., a steel material) that has a relatively lower coefficient of thermal expansion than a second material (e.g., a stainless steel material) forming the cage 230. Using a material having a relatively lower coefficient of thermal expansion to form the cage retainer 228 reduces the total amount of thermal expansion of the cage 230 and the cage retainer 228 assembly by approximately one half (½) as compared to a single-piece cage (not shown) made of a stainless steel material or an assembly in which the cage retainer 228 and the cage 230 are both made of a stainless steel material. Additionally, such an approach enables the cage 230 to be made of a substantially non-corrosive material (e.g., a stainless steel), which reduces the likelihood that the closure member 224 will become seized within the cage 230 and/or fail to engage the seat 242.

Providing the fluid valve 200 with the cage retainer 228 made of the first material having a relatively lower coefficient of thermal expansion than the second material forming the cage 230 reduces an amount of thermal expansion as compared to the alternatives described above. However, if an outer or exterior surface 248 of the cage retainer 228 were to continuously engage an inner surface 250 of the bonnet 210, over time, corrosion may occur between the outer surface 248 of the cage retainer 228 and the inner surface 250 of the bonnet 210 because the cage retainer 228 and the bonnet 210 may be made of a similar or identical material (e.g., a steel material) having similar or identical coefficients of thermal expansion. Such corrosion may substantially fix the cage retainer 228 relative to the bonnet 210, thereby compromising the operation of the dynamic joint 252 and increasing the difficulty encountered when disassembling the valve trim 226 of the fluid valve 200. Specifically, if the cage retainer 228 becomes fixed (e.g., corroded) to the bonnet 210 the dynamic joint 252 becomes compromised and the cage retainer 228 may no longer be able to move relative to the bonnet 210 during thermal cycles. As a result, the cage retainer 228 and the cage 230 may fail to maintain the seat 242 in sealing engagement with the aperture 244 of the valve body 202 and/or the alignment of the valve trim 226 may be compromised, thereby affecting the performance of the fluid valve 200.

Figure 3:
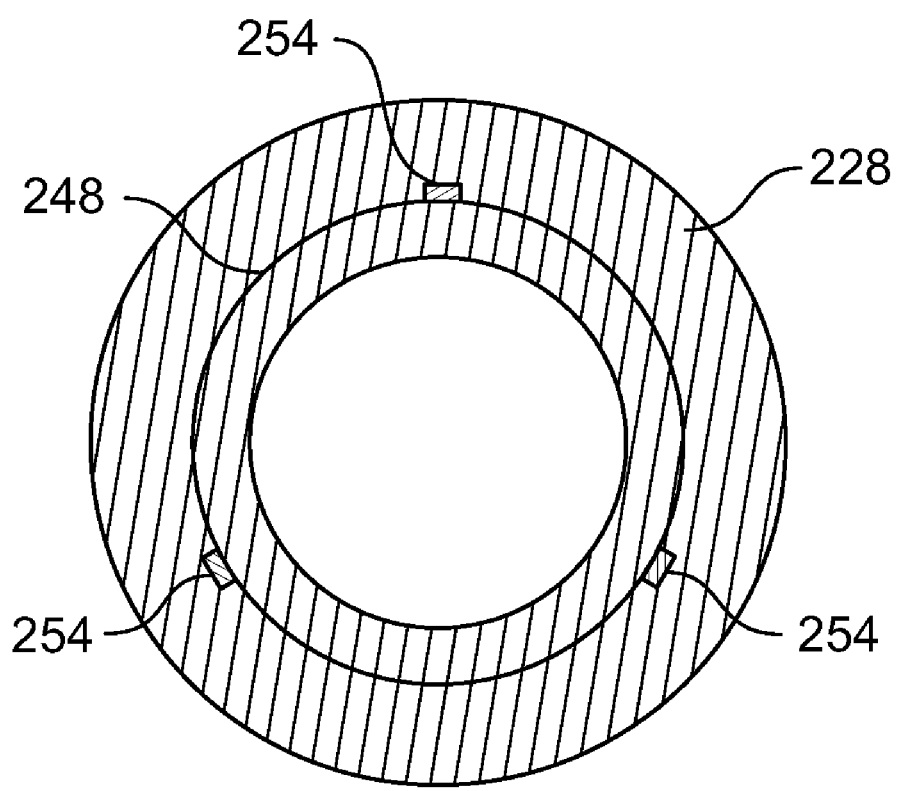
FIG. 3 depicts the example cage retainer of FIG. 2 having a plurality of projections extending from an exterior surface.

Referring to FIGS. 2 and 3, to ensure that the operation of the dynamic joint 252 is not compromised due to corrosion or the like, the exterior surface 248 of the cage retainer 228 is provided with a plurality of projections 254 (FIG. 3), each having a relatively small surface area, that are radially spaced about the exterior surface 248. While the example cage retainer 228 is depicted in FIG. 3 as including three projections 254, the example cage retainer 228 may include any number of projections 254 (e.g., 1, 2, 3, etc.) that are similarly or differently shaped.

Generally, each of the projections 254 provides one or more contact points between the exterior surface 248 of the cage retainer 228 and the inner surface 250 of the bonnet 210, thereby enabling the dynamic joint 252 to be maintained between the cage retainer 228 and the bonnet 210. Specifically, to maintain the dynamic joint 252, each of the projections 254 may be made of a third material such as, for example, a stellite alloy material, a cobalt alloy material, a non-corrosive material, etc., while the bonnet 210 and the cage retainer 228 may be made of the first material such as, for example, a steel material. The materials from which the projections 254 and the cage retainer 228 and the bonnet 210 are made substantially prevent the bonnet 210 and the cage retainer 228 from becoming corroded together over time. As discussed above, if the exterior surface 248 of the cage retainer 228 were to engage (e.g., continuously engage) the inner surface 250 of the bonnet 210, this interaction would enable the surfaces 248 and 250 to become corroded together. While not shown, in other examples, the exterior surface 248 may alternatively or additionally be provided with a coating of a non-corrosive material, such as chrome, that acts as a buffer between the exterior surface 248 and the inner surface 250 to maintain the dynamic joint 252. In such examples, the example cage retainer 228 may not be provided with the projections 254.

To assemble the fluid valve 200, the seat 242 is positioned at least partially within the aperture 244 and the cage 230 is inserted into the valve body 202 to engage and/or interlock the opposing steps 238 and 240 of the cage 230 and the seat 242, respectively. The cage retainer 228 is then positioned in the valve body 202 such that the end 234 of the cage retainer 228 engages the opposing end 236 of the cage 230 and the other end 232 of the cage retainer 228 is positioned adjacent the bonnet 210. The bonnet 210 may then be aligned and coupled to the valve body 202 via the fasteners 212. Specifically, a portion 262 of the bonnet 210 is positioned such that the inner surface 250 of the bonnet 210 surrounds the exterior surface 248 of the cage retainer 228 and the projections 254 are positioned between the surfaces 248 and 250.

To compensate for the difference in the coefficients of thermal expansion of the cage 230 relative to the cage retainer 228, the valve body 202 and/or the bonnet 210, a bias element 258 (e.g., a spring or seal) may be positioned adjacent a step 260 defined by the cage retainer 228. Specifically, the bias element 258 may react (e.g., expand or contract) in response to the relative position of the cage retainer 228 and/or the cage 230 within the valve body 202. For example, as the fluid valve 200 is exposed to heat (e.g., a thermal cycle), the cage 230 may expand (e.g., elongate), thereby moving the cage retainer 228 and, thus, the step 260 toward the bonnet 210 and compressing the bias element 258.

Figure 4:
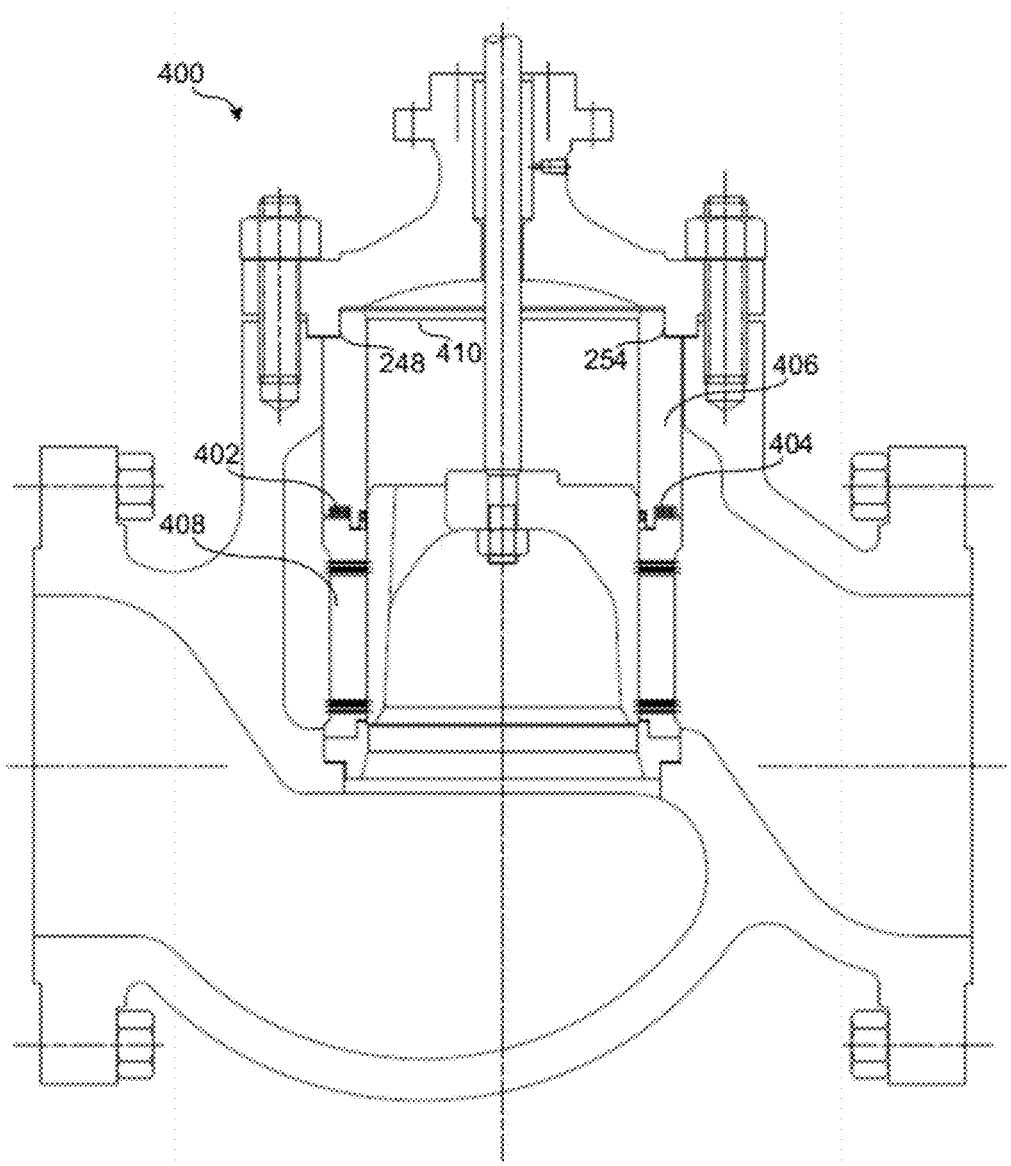
FIG. 4 depicts an alternative example fluid valve having a spring element between an example cage retainer and a cage.

As discussed above, the projections 254 positioned between the exterior surface 248 and the inner surface 250 enable the dynamic joint 252 to be maintained and, thus, the cage retainer 228 to be movable relative to the bonnet 210. While the bias element 258 is positioned adjacent the bonnet 210 in the example fluid valve 200 of FIG. 2, the bias element 258 may be positioned in any other suitable position. For example, FIG. 4 depicts an example fluid valve 400 having a spring element 402 positioned within a groove 404 between a cage retainer 406 and a cage 408.

Figure 5:
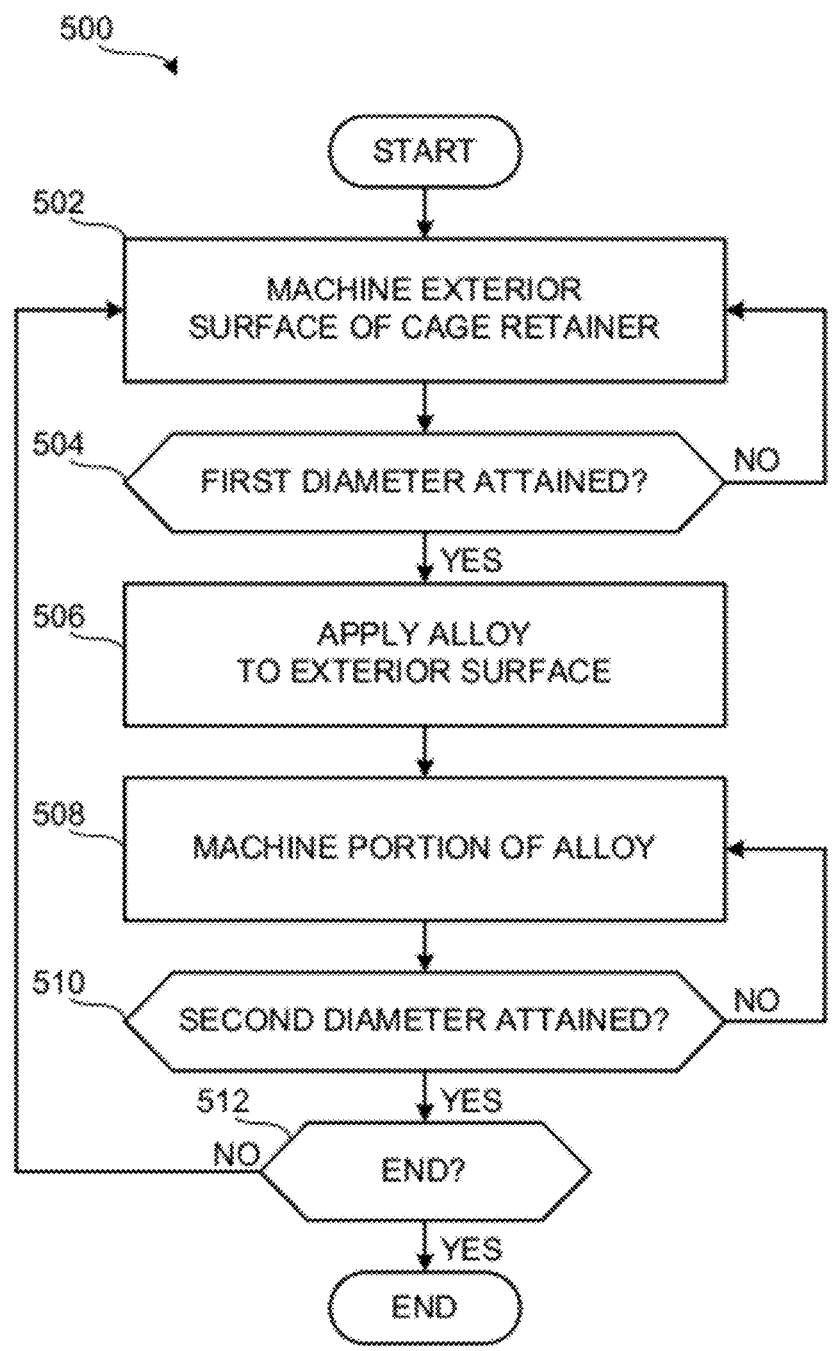
FIG. 5 is a flow diagram representative of an example process that may be performed to produce the examples described herein.

The flow diagram depicted in FIG. 5 is representative of a process or method 500 that can be performed to produce the example apparatus described herein. In particular, FIG. 5 depicts a flow diagram representative of operations that may be performed to produce, for example, the example cage retainer 228 (FIG. 2) or any other of the examples described herein. Further, although the example operations of FIG. 5 are described with reference to the flow diagram of FIG. 5 other methods of implementing the method 500 of FIG. 5 may be employed. For example, the order of execution of the blocks may be changed, and/or some of the blocks described may be changed, eliminated, sub-divided, or combined.

Turning in detail to FIG. 5 and with reference to FIG. 2, the exterior surface 248 of the cage retainer 228 (FIG. 2) is machined (block 502) such that a diameter 264 of the cage retainer 228 (FIG. 2) is substantially similar to a first diameter (e.g., a first predetermined diameter). Generally, the first diameter is relatively smaller than an inner diameter 266 of the bonnet 210 (FIG. 2). In some examples, the first diameter may have a diameter of approximately five millimeters less than the second diameter discussed below.

Figure 6:
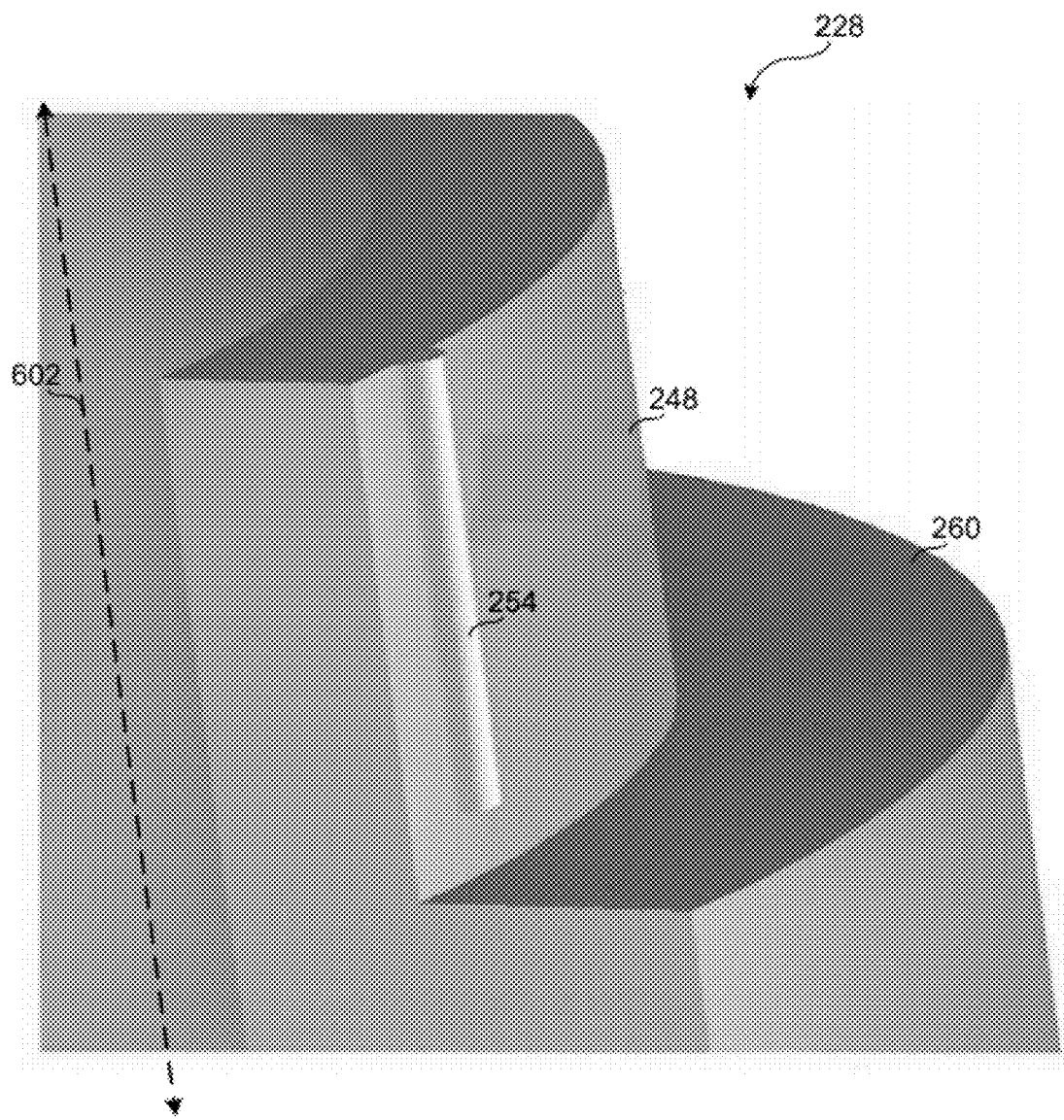
FIG. 6 depicts one of the plurality of projections of the example cage retainer of FIG. 2 prior to being machined.

The example method 500 then determines whether or not the first diameter has been attained (block 504) (e.g., the diameter 264 of the cage retainer 228 (FIG. 2) is substantially similar to the first diameter). If the example method 500 determines that the first diameter has not been attained, control returns to block 502. However, if the example method 500 determines that the first diameter has been attained, control advances to block 506. Alloy is then applied to the exterior surface 248 (block 506) of the cage retainer 228 (FIG. 2) to form the plurality of projections 254 extending from the exterior surface 248, as shown in FIG. 6, along a longitudinal axis 602 of the cage retainer 228.

Figure 8:
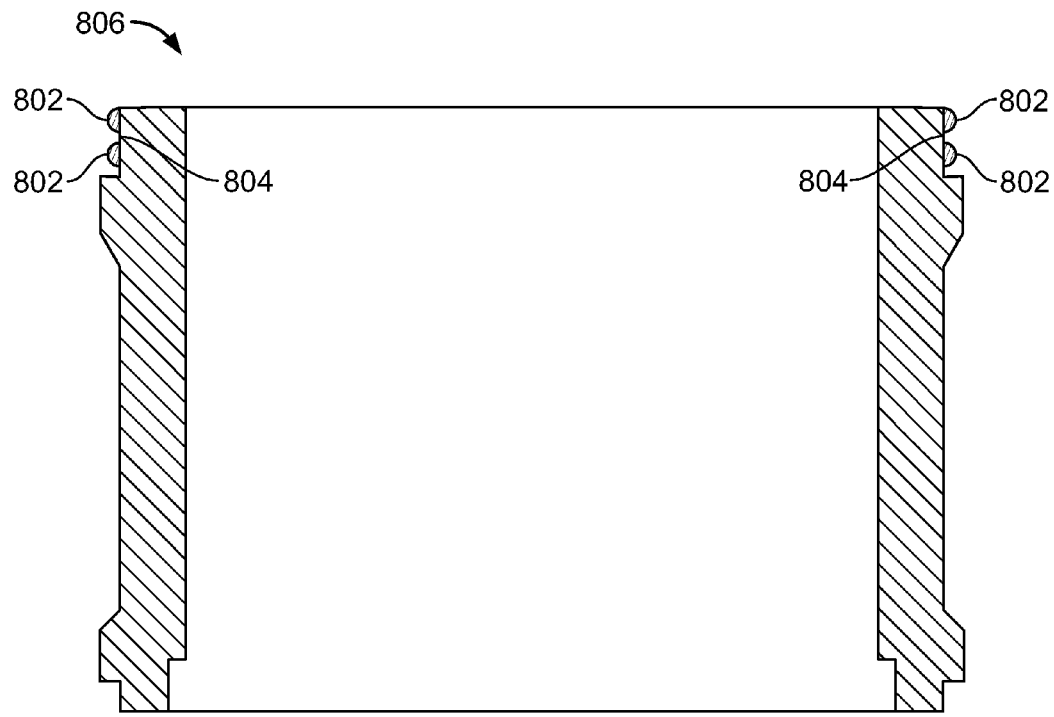
FIG. 8 depicts another example cage retainer having a plurality of annular projections extending from an exterior surface.
Figure 9:
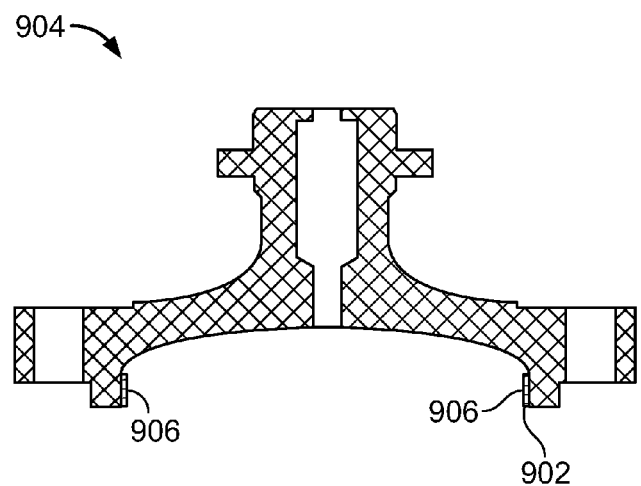
FIG. 9 depicts an example bonnet having a plurality of projections extending from an inner surface.
Figure 1:
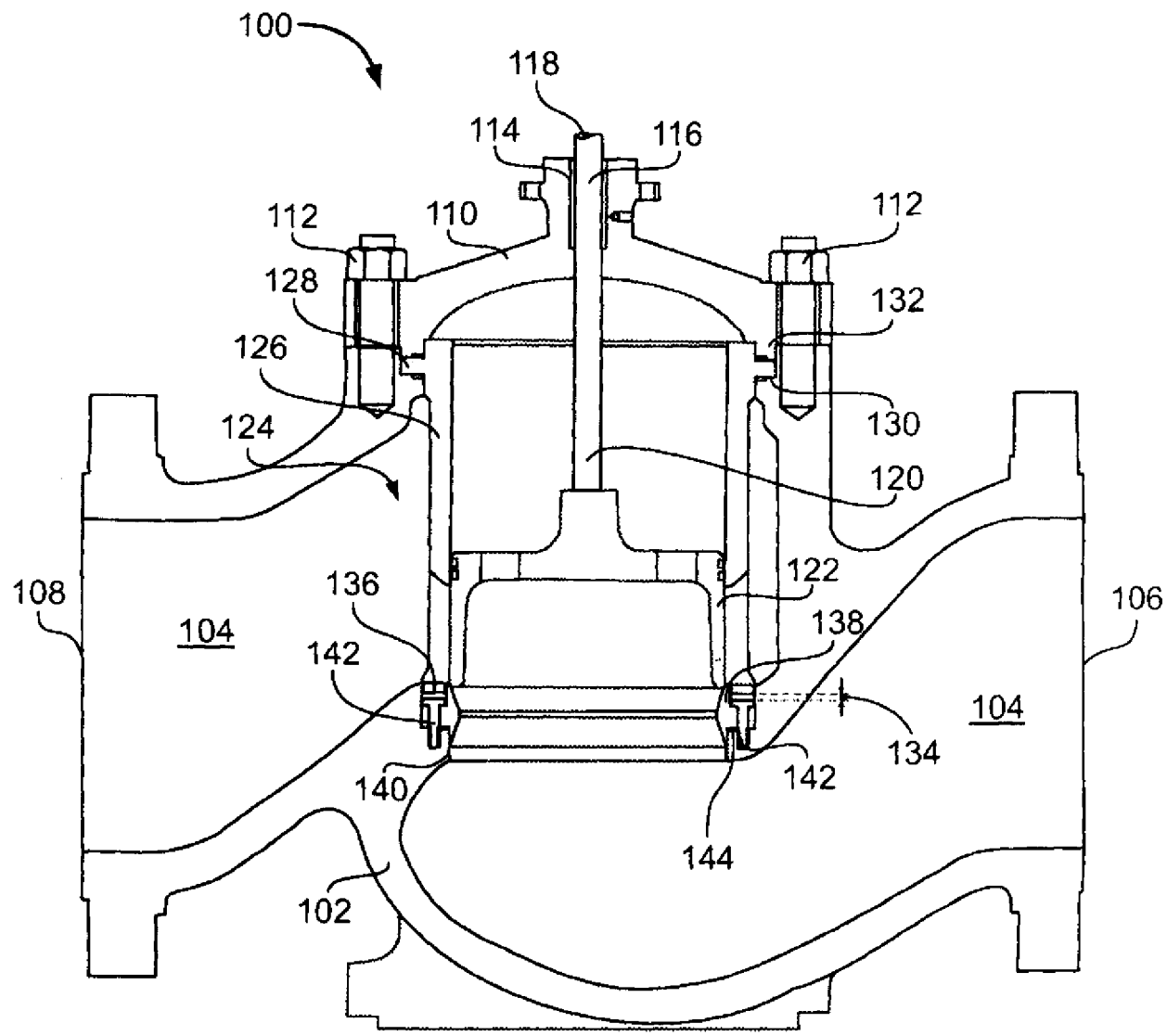
Figure 2:
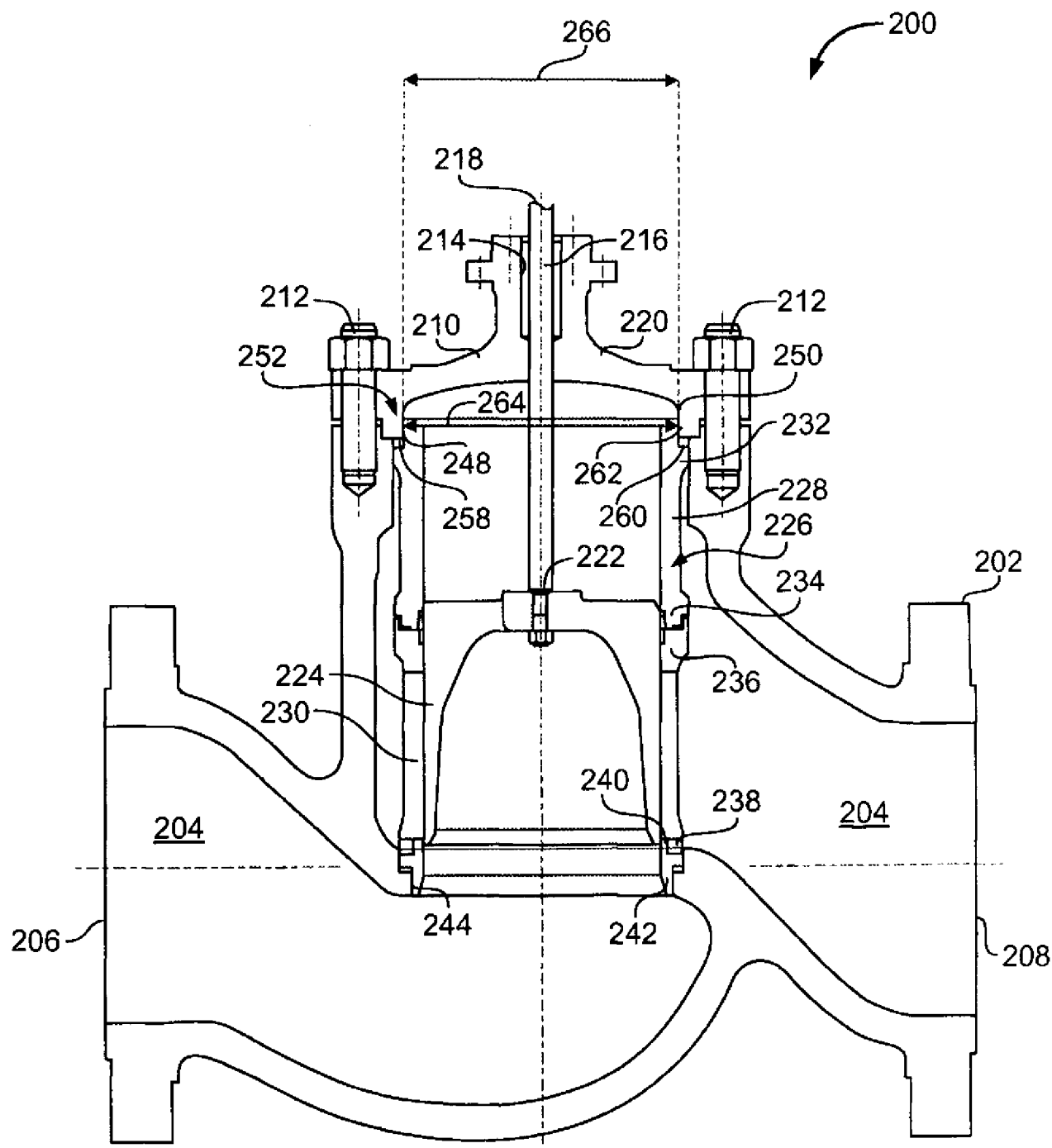
Figure 3:
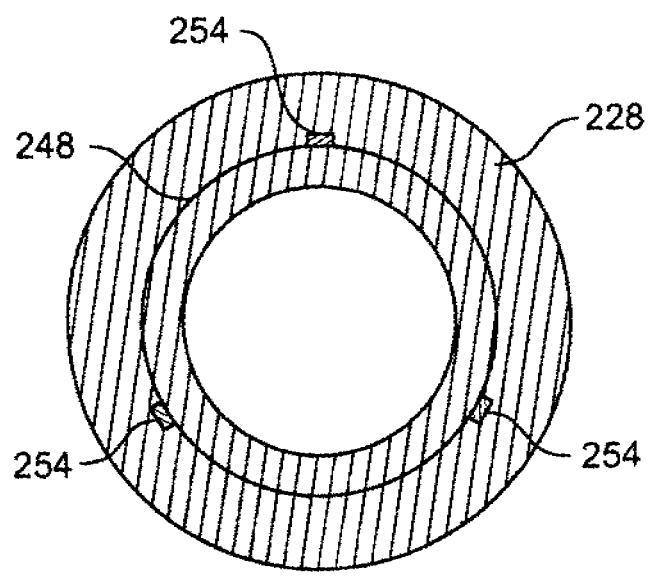
Figure 4:
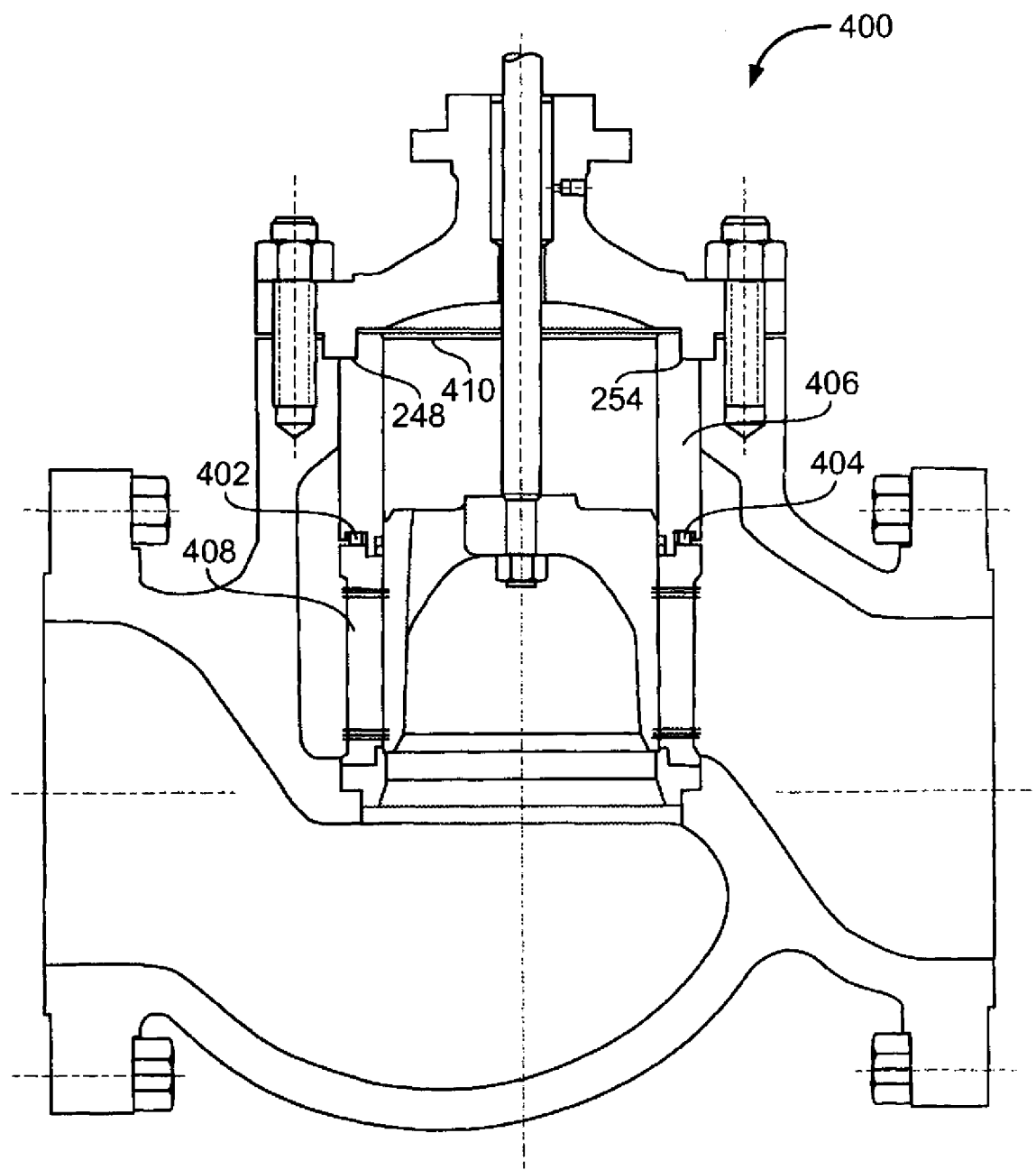
Figure 5:
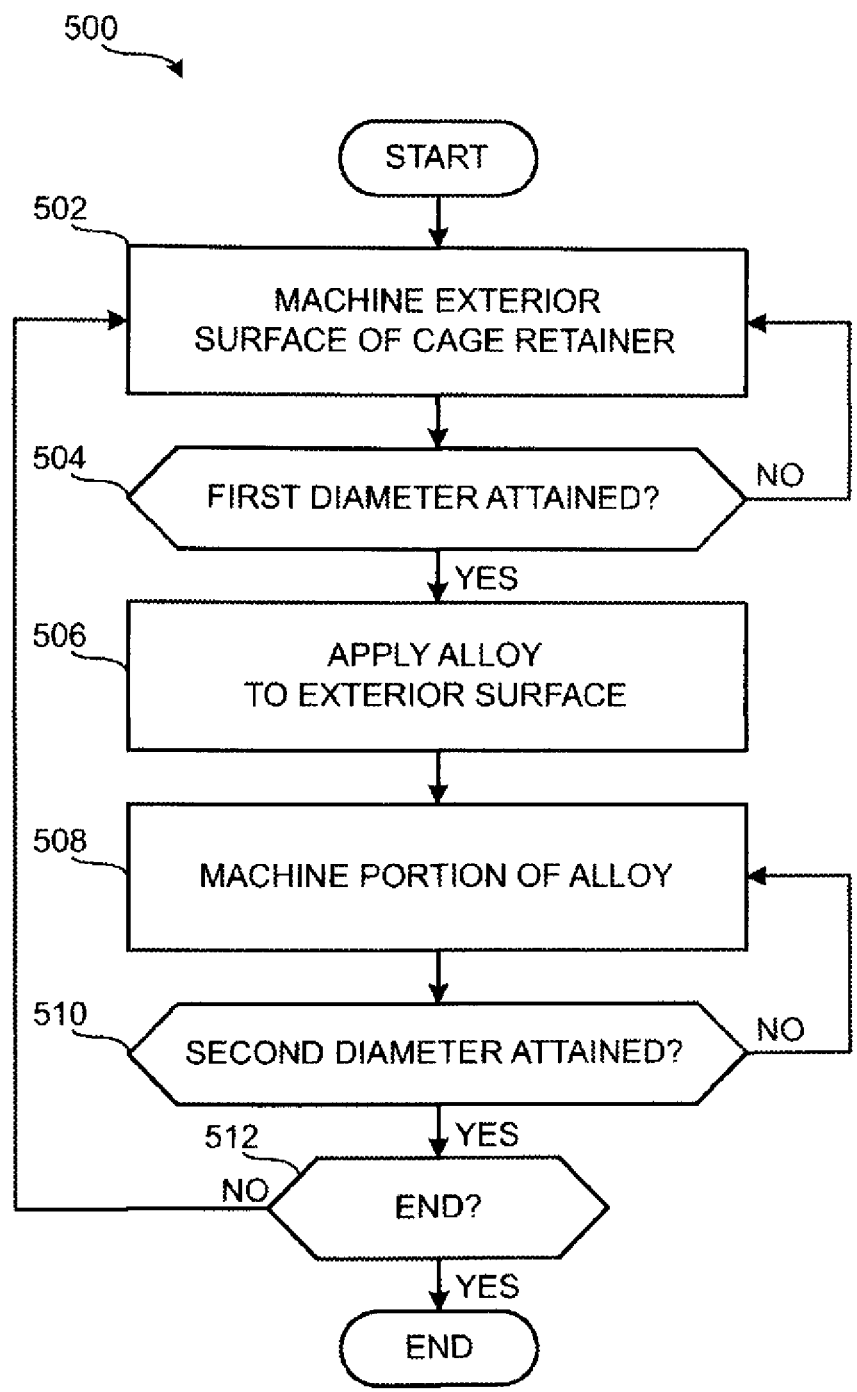
Figure 6:
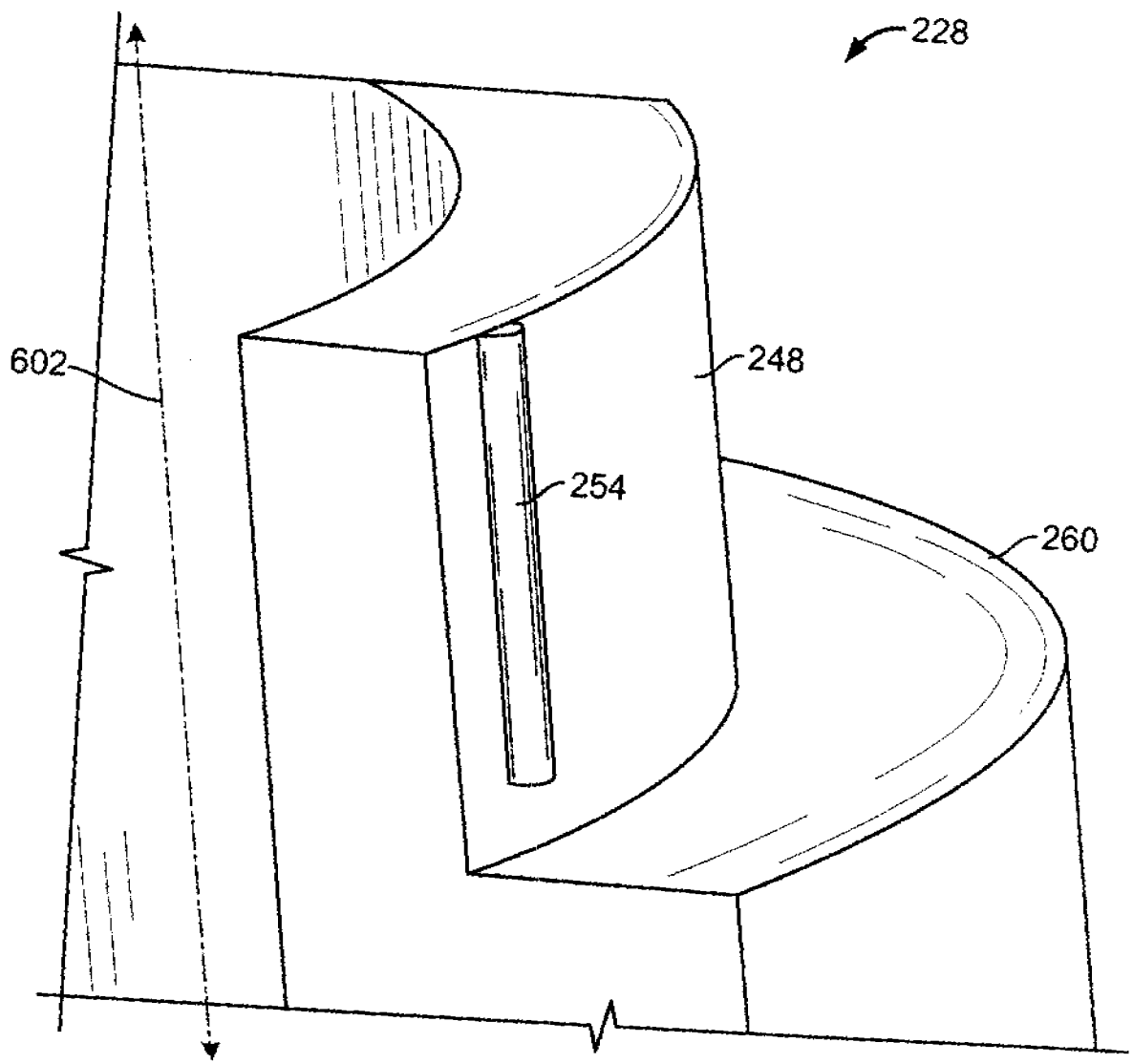
Figure 7:
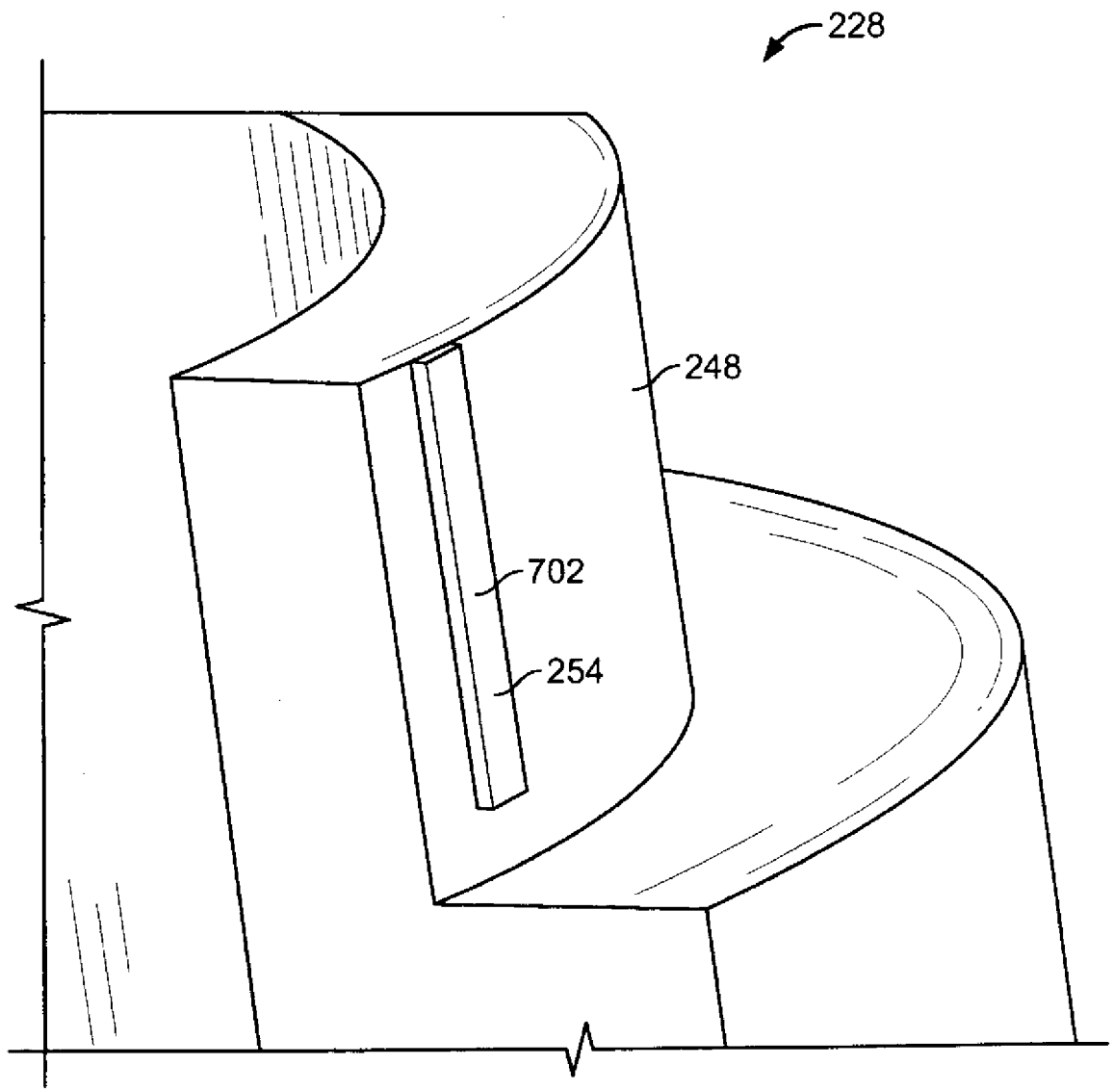
Figure 8:
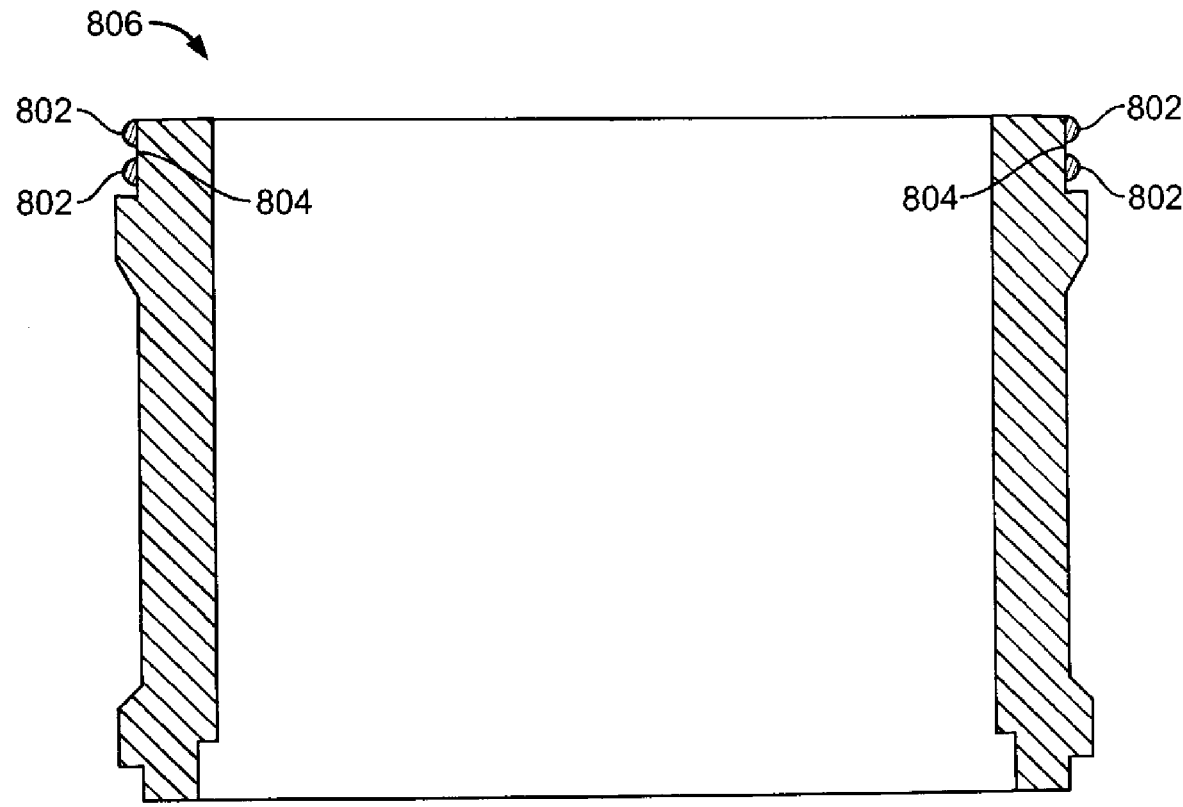
Figure 9:
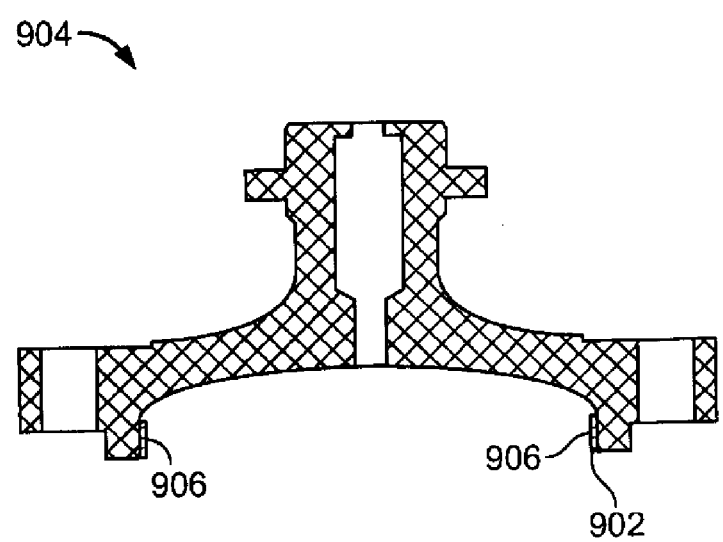

In some examples, as shown in FIG. 3, the example cage retainer 228 (FIG. 2) may include three (3) of the projections 254 evenly spaced about the exterior surface 248. However, the cage retainer 228 (FIG. 2) may include any number of the projections 254 that may be positioned about the exterior surface 248 in any suitable arrangement. For example, as shown in FIG. 8, a plurality of projections 802 may be a plurality of annular rings extending from an exterior surface 804 of a cage retainer 806. While the example depicted in FIG. 8 includes two projections, the example cage retainer 806 may include any number of projections (e.g., 1, 2, 3, 4, etc.). Alternatively, as shown in FIG. 9, an inner surface 902 of a bonnet 904 may be provided with a plurality of projections 906 as opposed to the exterior surface 248 of the cage retainer 228. In such examples, the projections 906 may extend inwardly from the inner surface 902.

Figure 7:
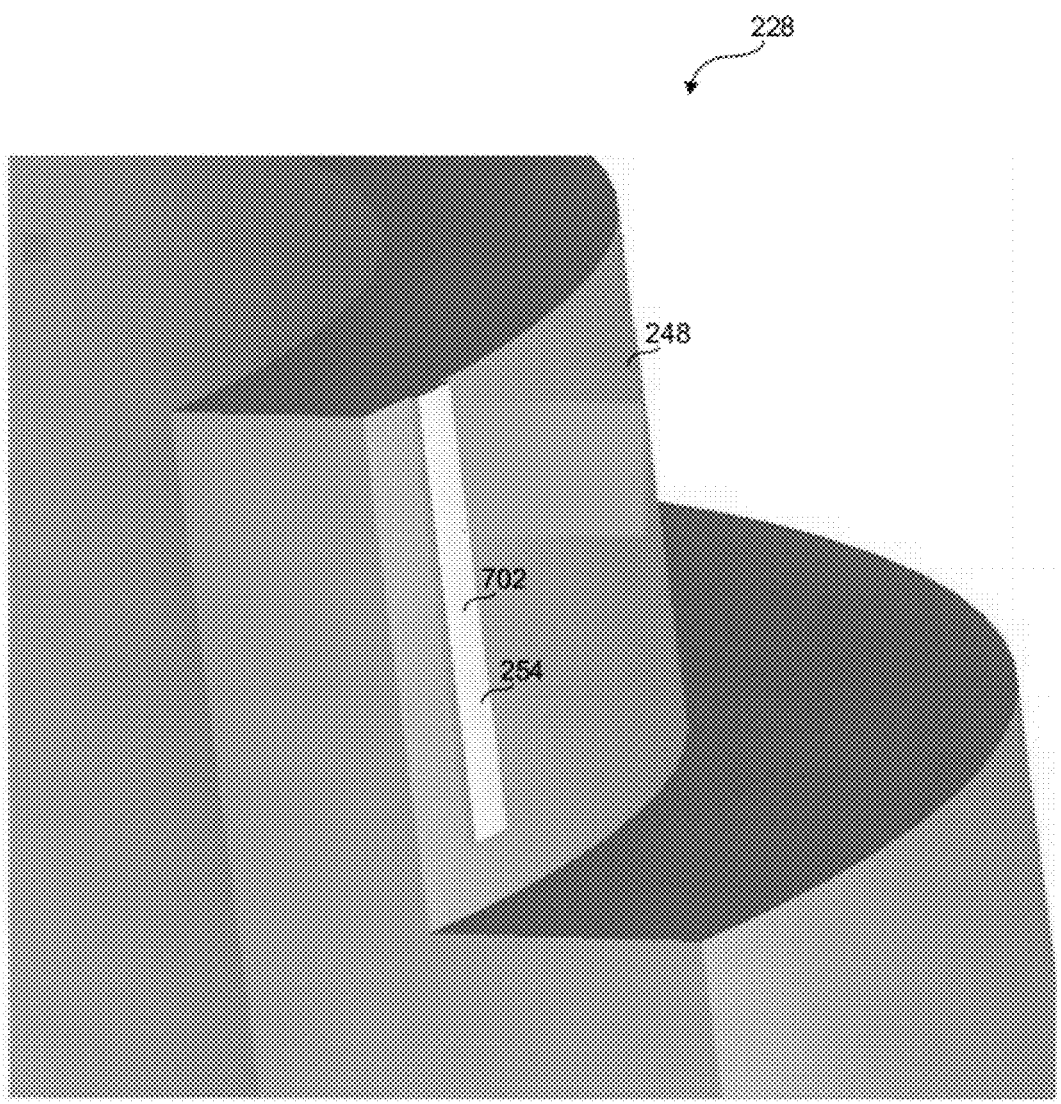
FIG. 7 depicts one of the plurality of projections of the example cage retainer of FIG. 2 after being machined.

A portion of the plurality of projections 254 may then be machined (block 508), as shown in FIG. 7, such that a diameter of the cage retainer 228 (FIG. 2) with the plurality of projections 254 is substantially similar to a second diameter (e.g., a second predetermined diameter). Generally, the second diameter corresponds to the inner diameter 266 of the bonnet 210. As depicted in FIG. 7, in some examples, each of the plurality of projections 254 is elongated and may include a substantially rectangularly shaped surface 702 that is to at least partially contact the inner surface 250 of the bonnet 210.

The example method 500 then determines whether or not the second diameter has been attained (block 510) (e.g., the diameter of the cage retainer 228 (FIG. 2) including the plurality of projections 254 is substantially similar to the second diameter). If the example method 500 determines that the second diameter has not been attained, control returns to block 508. However, if the example method 500 determines that the second diameter has been attained, control advances to block 512 and the example method 500 determines whether it should machine another cage retainer (block 512). Otherwise the example method 500 of FIG. 5 is ended.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

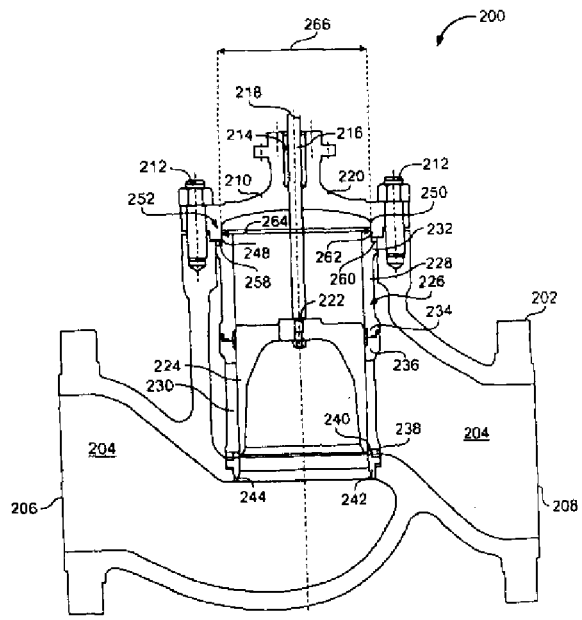

What is claimed is:

1. An apparatus for use with a fluid valve, comprising:
a body to retain a cage of the fluid valve, the cage to secure a valve seat relative to a flow aperture, the cage comprising an aperture through which fluid is to flow and a surface to be sealingly engaged by a closure member; and
a plurality of projections projecting from an exterior surface of the body, wherein each of the plurality of projections is to provide one or more contact points between the body and an inner surface of a bonnet coupled to the fluid valve.

2. The apparatus as defined in claim 1, wherein the plurality of projections are radially spaced about the exterior surface of the body.

3. The apparatus as defined in claim 1, wherein the projections are elongated and have lengths extending along a longitudinal axis of the body.

4. The apparatus as defined in claim 1, wherein the projections have rectangularly shaped surfaces to contact the corresponding surfaces of the bonnet.

5. The apparatus as defined in claim 1, wherein an interaction between the plurality of projections and the inner surface of the bonnet is to prevent a continuous engagement between the exterior surface of the body and the inner surface of the bonnet.

6. The apparatus as defined in claim 5, wherein the interaction comprises a dynamic joint between the body and the bonnet.

7. The apparatus as defined in claim 1, wherein the body comprises a first material and each of the plurality of projections comprises a second material different from the first material.

8. The apparatus as defined in claim 7, wherein the first material comprises a steel material and the second material comprises a cobalt alloy material.

9. The apparatus as defined in claim 1, wherein the apparatus comprises a cage retainer.

10. The apparatus as defined in claim 9, wherein the cage retainer comprises an upper cage retainer.

11. A fluid valve for controlling fluid flow, comprising:
a valve body defining:
an inlet port;
an outlet port; and
a flow aperture;
a valve seat at least partially positioned within the flow aperture;
a cage retainer positioned within the valve body to secure a cage in engagement with the valve seat and to be sealingly engaged by a closure member, wherein the cage retainer comprises:
a plurality of projections projecting from and radially spaced about an exterior surface of a body of the cage retainer, wherein each of the plurality of projections is to provide one or more contact points between the body and an inner surface of a bonnet coupled to the fluid valve, wherein the cage retainer comprises a first material and the projections comprise a second material different from the first material.

12. The fluid valve as defined in claim 11, wherein the first material comprises a steel material and the second material comprises a cobalt alloy material.

13. The fluid valve as defined in claim 11, wherein the cage retainer comprises an upper cage retainer.

14. The fluid valve as defined in claim 11, wherein an interaction between the plurality of projections and the corresponding surface of the bonnet is to prevent a continuous engagement between the exterior surface of the body and the inner surface of the bonnet.

15. The fluid valve as defined in claim 14, wherein the interaction comprises a dynamic joint between the body and the bonnet.

16. The fluid valve as defined in claim 11, wherein the cage is to guide the closure member of the fluid valve.

17. The fluid valve as defined in claim 16, wherein the cage is coaxially aligned with the cage retainer.

18. A fluid valve for controlling fluid flow, comprising:
a valve body defining:
an inlet port; and
an outlet port;
a cage defining an aperture through which fluid is to flow, a closure member to sealingly engage a surface of the cage;
a cage retainer positioned within the valve body to retain the cage;
a bonnet coupled to the valve body; and
means for maintaining a dynamic joint between an exterior surface of the cage retainer and an inner surface of the bonnet, wherein the means for maintaining the dynamic joint comprises a plurality of projections projecting from the exterior surface of the cage retainer.

19. The fluid valve as defined in claim 18, wherein each of the plurality of projections is to provide one or more contact points between the cage retainer and the inner surface of the bonnet.

20. The fluid valve as defined in claim 18, wherein an interaction between the plurality of projections and the inner surface of the bonnet is to prevent a continuous engagement between the exterior surface of the cage retainer and the inner surface of the bonnet.

21. The fluid valve as defined in claim 18, wherein the cage retainer comprises a first material and each of the plurality of projections comprises a second material different from the first material.

22. A fluid valve for controlling fluid flow, comprising:
a valve body defining:
an inlet port; and
an outlet port;
a cage defining an aperture through which fluid is to flow, a closure member to sealingly engage a surface of the cage;
a cage retainer positioned within the valve body to retain the cage;
a bonnet coupled to the valve body; and
means for maintaining a dynamic joint between an exterior surface of the cage retainer and an inner surface of the bonnet, wherein the means for maintaining the dynamic joint comprises a plurality of projections projecting from the inner surface of the bonnet.

23. A bonnet for use with a fluid valve, comprising:
a body to be coupled to the fluid valve; and
a plurality of projections projecting from an inner surface of the body, wherein each of the plurality of projections is to provide one or more contact points between the body and an exterior surface of a cage retainer positioned in the fluid valve to retain a cage of the fluid valve, wherein the body comprises a first material and the projections comprise a second material different from the first material, the cage comprising an aperture through which fluid is to flow and a surface to be sealingly engaged by a closure member.

* * * * *

UNITED STATES PATENT AND TRADEMARK OFFICE
CERTIFICATE OF CORRECTION

PATENT NO.       : 8,356,622 B2                                    Page 1 of 10
APPLICATION NO.  : 12/480425
DATED            : January 22, 2013
INVENTOR(S)      : Wears It is certified that error appears in the above-identified patent and that said Letters Patent is hereby corrected as shown below:

The Title Page showing the illustrative figure should be deleted to be replaced with the attached Title Page.

In the Drawings:
Figs. 1-9 should be replaced with the corrected Figs. 1-9 as shown on the attached pages.

Signed and Sealed this
Eighteenth Day of February, 2014

Michelle K. Lee
*Deputy Director of the United States Patent and Trademark Office*

(12) United States Patent
Wears

(10) Patent No.: US 8,356,622 B2
(45) Date of Patent: Jan. 22, 2013

(54) FLUID VALVES HAVING DYNAMIC VALVE TRIM JOINTS

(75) Inventor: William E. Wears, Marshalltown, IA (US)

(73) Assignee: Fisher Control International, LLC, Marshalltown, IA (US)

( * ) Notice: Subject to any disclaimer, the term of this patent is extended or adjusted under 35 U.S.C. 154(b) by 781 days.

(21) Appl. No.: 12/480,425

(22) Filed: Jun. 8, 2009

(65) Prior Publication Data

US 2010/0307610 A1 Dec. 9, 2010

(51) Int. Cl.
*F16K 25/00* (2006.01)

(52) U.S. Cl. .............. 137/454.6; 137/468; 251/324; 251/366; 251/368

(58) Field of Classification Search .......... 137/454.2, 137/454.6, 468; 251/281, 282, 318, 324, 251/366, 368
See application file for complete search history.

(56) References Cited

U.S. PATENT DOCUMENTS

| | | | | |
|---|---|---|---|---|
| 3,506,242 A | * | 4/1970 | Aunspach | 251/361 |
| 3,742,984 A | * | 7/1973 | Wilkins et al. | 137/629 |
| 3,834,666 A | * | 9/1974 | Keith | 251/361 |
| 4,542,879 A | * | 9/1985 | Stein | 251/360 |
| 5,012,841 A | * | 5/1991 | Kueffer | 137/625.39 |
| 5,492,146 A | * | 2/1996 | George et al. | 137/505.41 |
| 6,997,211 B2 | | 2/2006 | Alman et al. | |
| 2003/0197144 A1 | | 10/2003 | Nguyen | |
| 2006/0138375 A1 | * | 6/2006 | Baumann | 251/175 |
| 2008/0203346 A1 | * | 8/2008 | Shu | 251/214 |

FOREIGN PATENT DOCUMENTS

| | | |
|---|---|---|
| EP | 2 042 685 A1 | 4/2009 |
| GB | 1236631 | 6/1971 |
| WO | 2006/073678 A1 | 7/2006 |
| WO | 2008/032101 A1 | 3/2008 |

OTHER PUBLICATIONS

Patent Cooperation Treaty, "International Search Report," issued by the International Searching Authority in connection with related PCT application No. PCT/US2010/033762, mailed Sep. 27, 2010 (4 pages).

Patent Cooperation Treaty, "Written Opinion of the International Searching Authority," issued by the International Searching Authority in connection with related PCT application No. PCT/US2010/033762, mailed Sep. 27, 2010 (9 pages).

\* cited by examiner

*Primary Examiner* — Craig Schneider
*Assistant Examiner* — Ian Paquette
(74) *Attorney, Agent, or Firm* — Hanley, Flight & Zimmerman, LLC

(57) ABSTRACT

Fluid valves having dynamic valve trim joints are described. An example apparatus for use with a fluid valve includes a body configured to retain a cage of a fluid valve. Additionally, the example apparatus includes a plurality of projections projecting from and radially spaced about an exterior surface of the body. Each of the plurality of projections is to provide one or more contact points between the body and an inner surface of a bonnet coupled to the fluid valve.

23 Claims, 8 Drawing Sheets